(12) United States Patent
Knauff et al.

(10) Patent No.: US 7,901,127 B2
(45) Date of Patent: Mar. 8, 2011

(54) DRIVE FOR A MACHINE FOR SYNTHETIC MATERIAL PLASTICIZATION AND INJECTION

(75) Inventors: Axel Knauff, Münnerstadt (DE); Holger Schunk, Lendershausen (DE)

(73) Assignee: Siemens Aktiengesellschaft, München (DE)

( * ) Notice: Subject to any disclaimer, the term of this patent is extended or adjusted under 35 U.S.C. 154(b) by 806 days.

(21) Appl. No.: 11/911,256

(22) PCT Filed: Jan. 11, 2007

(86) PCT No.: PCT/EP2007/050246
§ 371 (c)(1),
(2), (4) Date: Oct. 11, 2007

(87) PCT Pub. No.: WO2007/093470
PCT Pub. Date: Aug. 23, 2007

(65) Prior Publication Data
US 2009/0040862 A1 Feb. 12, 2009

(30) Foreign Application Priority Data
Feb. 17, 2006 (DE) .................. 10 2006 007 438

(51) Int. Cl.
*B29C 45/03* (2006.01)
(52) U.S. Cl. .......................................... 366/78; 366/100
(58) Field of Classification Search .............. 366/78, 366/100, 289
See application file for complete search history.

(56) References Cited

U.S. PATENT DOCUMENTS
3,319,297 A * 5/1967 Garvin et al. .................. 366/78
(Continued)

FOREIGN PATENT DOCUMENTS
DE 100 28 066 C1 12/2001
(Continued)

OTHER PUBLICATIONS

Jürgen Carstens: "Antrieb einer Kunststoffspritzgussmaschine mit nur einem Motor"; IP.Com Journal, IP.Com Inc., West Henrietta, NY, US; Apr. 25, 2004; XP013014611; ISSN: 1533-0001, Seite 1, Abbildung 2.

*Primary Examiner* — David L Sorkin
(74) *Attorney, Agent, or Firm* — Henry M. Feiereisen; Ursula B. Day

(57) ABSTRACT

The drive device (1) is intended for a machine for the plasticization and injection of synthetic material. It comprises a main drive (2) drivable in a first and a second direction of rotation and having a hollow shaft (6) rotatable about an axis of rotation (4). An axially bipartite inner reception region (7) having a first part region (8) and a second part region (9) is formed by the hollow shaft (6). Rotation transmission means (10, 14), arranged at least partially in the first part region (8), are provided for the transmission of a rotational movement of the hollow shaft (6) solely in a first direction of rotation to an extruder worm (16) rotatable about the axis of rotation (4). Conversion means (12, 19, 20), arranged at least partially in the second part region (9), are provided for the transmission of a rotational movement of the hollow shaft (6) in the first and a second direction of rotation to a supporting shaft (11) rotatable about the axis of rotation (4) and displaceable axially in both directions and for the conversion of the transmitted rotational movement into an axial movement of the supporting shaft (11).

12 Claims, 2 Drawing Sheets

U.S. PATENT DOCUMENTS

| | | | |
|---|---|---|---|
| 3,822,867 A * | 7/1974 | Evans | 366/79 |
| 5,891,485 A * | 4/1999 | Emoto | 425/145 |
| 7,112,902 B2 * | 9/2006 | Schunk et al. | 310/90 |
| 7,114,940 B2 * | 10/2006 | Ickinger et al. | 425/145 |
| 2002/0064084 A1 * | 5/2002 | Meyer | 366/100 |
| 2002/0076465 A1 * | 6/2002 | Knauff et al. | 425/542 |

FOREIGN PATENT DOCUMENTS

| | | |
|---|---|---|
| DE | 102 22 748 C1 | 5/2003 |
| JP | 08 039631 A | 2/1996 |
| WO | WO 97/18938 A1 | 5/1997 |
| WO | WO 01/89799 A1 | 11/2001 |

\* cited by examiner

DRIVE FOR A MACHINE FOR SYNTHETIC MATERIAL PLASTICIZATION AND INJECTION

BACKGROUND OF THE INVENTION

The invention relates to a drive device for a machine for the plasticization and injection of synthetic material.

A drive device of this type is known, for example, from DE 100 28 066 C1. It is used in synthetic material processing machines which are designed as injection molding machines.

Their functioning can be divided into two main process steps. During the first, the plasticization of the synthetic material granulate supplied, an extruder worm is rotated and at the same time is moved axially rearward, that is to say away from an injection orifice. The synthetic material to be injected is thereby conveyed forward, while at the same time being heated and plasticized. During this, a counter force may also be necessary in order to implement a higher pressure during the plasticizing operation. The second main process step is the injection of the plasticized synthetic material into a molding die. In this case, the extruder worm is pushed axially forward.

In known drive devices, two drive motors and two associated converters, designed in each case according to the maximum torque occurring, are necessary. One motor takes over the rotational movement of the extruder worm and the other the forward push of the latter. Force transmission takes place, for example, by means of a ballscrew spindle with an associated spindle nut. The spindle body and the extruder worm connected to it are rotated by the first drive motor during the plasticizing step. The second drive motor corotates idly or generates counter pressure, as required. During the injection step, the first drive motor prevents a (reverse) rotational movement of the extruder worm, and the second drive motor rotates the spindle nut, with the result that the extruder worm is pushed forward. The process sequence described is thereafter repeated.

SUMMARY OF THE INVENTION

The object of the invention is to specify a drive device of the type initially designated, which can be produced and operated cost-effectively.

This object is achieved in accordance with the invention by a drive device which comprises:
a) a main drive drivable in a first and a second direction of rotation and having a hollow shaft rotatable about an axis of rotation,
b) an axially bipartite inner reception region formed by the hollow shaft and having a first part region and a second part region,
c) rotation transmission means, arranged at least partially in the first part region, for the transmission of a rotational movement of the hollow shaft solely in a first direction of rotation to an extruder worm rotatable about the axis of rotation, and
d) conversion means, arranged at least partially in the second part region, for the transmission of a rotational movement of the hollow shaft in the first and a second direction of rotation to a supporting shaft rotatable about the axis of rotation and displaceable axially in both directions and for the conversion of the transmitted rotational movement into an axial movement of the supporting shaft.

In the drive device according to the invention, instead of the two highly dimensioned drive motors required in the prior art, only one main drive is provided. This is used for all the torque-intensive work steps. It can be used, in particular also because of the bipartition of the reception region and the rotation transmission and conversion means, both for the rotational movement of the extruder worm during the plasticizing operation and for the axial forward push of the extruder worm during the injection operation. Consequently, one drive motor, including the associated converter, can be saved. This lowers the production costs.

Moreover, during operation, a highly efficient utilization of the main drive occurs. In the prior art, in each case one of the two drive motors is alternately essentially unused. By contrast, in the drive device according to the invention, no such standstill or idling phases of the main drive arise. It is used virtually continuously. This increase in utilization is highly efficient and contributes to a lowering of the operating costs.

A further advantage of the drive device according to the invention is the highly compact form of construction. This results in a reduced overall construction length, particularly because of the double utilization of the reception region in the hollow shaft.

A variant is beneficial in which the extruder worm and the supporting shaft are coupled by means of an axial bearing arranged within the reception region. This coupling is highly space-saving.

Furthermore, the rotation transmission means may preferably comprise a first freewheel in the second direction of rotation. This is beneficial because the rotational movement of the extruder worm preferably takes place only in one direction of rotation, to be precise in the first direction of rotation. Only then (=plasticizing phase) does the first freewheel transmit a torque from the hollow shaft to the extruder worm. By contrast, this does not occur in the opposite, that is to say the second direction of rotation. The first freewheel decouples the hollow shaft and the extruder worm in terms of torque transmission in the second direction of rotation. During operation in the second direction of rotation, the drive device is in its injection phase, during which the plasticized synthetic material is injected by means of the axial forward push of the extruder worm. In order as far as possible to prevent a backflow of the injection material in this phase, a rotational movement of the extruder worm in the second direction of rotation is even somewhat undesirable.

According to another beneficial variant, the extruder worm is provided with a second freewheel in the first direction of rotation or with an actuable brake. As a result, during the axial forward push of the extruder worm during the injection operation, a rotational movement of the extruder worm in the second direction of rotation can be reliably suppressed. Otherwise, such a rotational movement could possibly occur automatically.

Furthermore, the hollow shaft, on the one hand, and the rotation transmission and conversion means, on the other hand, have preferably longitudinal groovings engaging one in the other and running in the axial direction. This allows, on the one hand, rotational coupling and torque transmission and, on the other hand, relative displacement in the axial direction, that is to say in the direction of the axis of rotation.

In a further beneficial refinement, the conversion means for converting the rotational movement into the axial movement comprise an external thread provided on the supporting shaft and a threaded nut with an internal thread. Said conversion can thus be achieved particularly simply and efficiently. This type of conversion requires few mechanical components and can also be implemented, in particular, free of oil.

Moreover, preferably, the threaded nut is drivable in rotation about the axis of rotation by means of an auxiliary drive. Then, for example during the plasticizing operation, the speed at which the extruder worm moves axially rearward and/or a counter pressure can be set in a directed manner. A free rearward movement can also thereby be set. Basically, however, the threaded nut may also be designed to be mounted fixedly, that is to say immovably. The auxiliary drive is preferably intended for the less force-intensive holding operations. Consequently, it can have markedly lower dimensioning than the main drive provided for the torque-intensive work steps and can also be designed more simply. In particular, there is no need for the auxiliary drive to be designed for a high torque. The main work is performed by the main drive. Depending on the application, if appropriate, the auxiliary drive also only corotates idly or brakes the movement.

According to an advantageous refinement, the auxiliary drive is designed as a direct drive having lower dimensioning than the main drive. Such a direct drive can be designed very simply. A particularly (cost)-effective variant of the direct drive is one in which the rotor or else only the permanent magnets of the rotor are fastened, for example shrunk, directly on the threaded nut.

It is preferable, moreover, if the supporting shaft has a spur toothing, into which a gearwheel, in particular drivable in rotation, engages. This also allows a high rotational speed of, for example, more than 500 revolutions per minute.

A variant is beneficial, furthermore, in which the conversion means for converting the rotational movement into the axial movement comprise an external thread provided on the supporting shaft and a worm gear engaging into the external thread. Said conversion can in this way, too, be achieved very simply and efficiently.

BRIEF DESCRIPTION OF THE DRAWING

Further features, advantages and details of the invention may be gathered from the following description of exemplary embodiments with reference to the drawing in which.

DETAILED DESCRIPTION OF PREFERRED EMBODIMENTS

Figure 1:
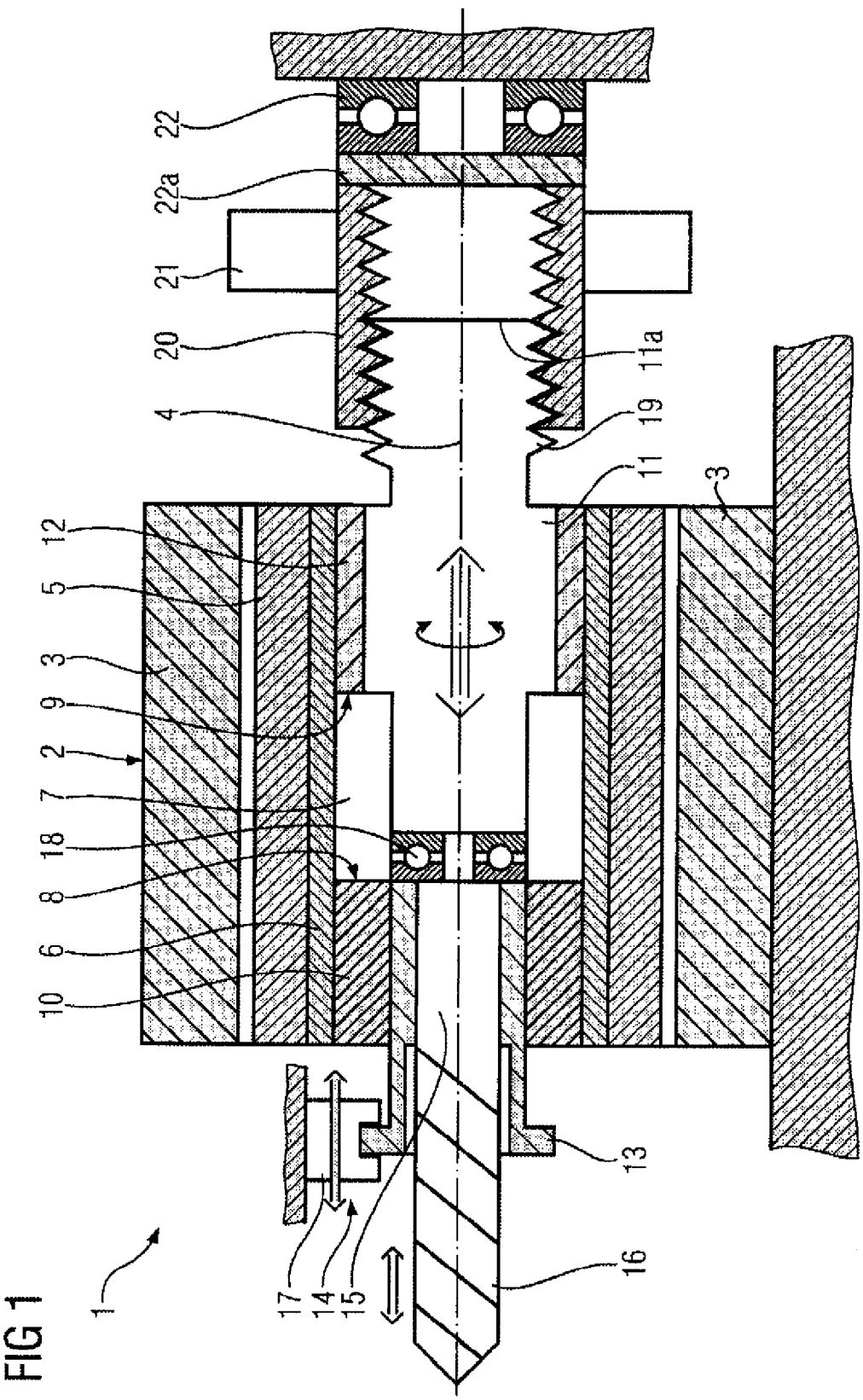
FIG. 1 shows an exemplary embodiment of a drive device with a main drive driving an extruder worm and a supporting shaft and with a threaded nut guidance of the supporting shaft.
Figure 3:
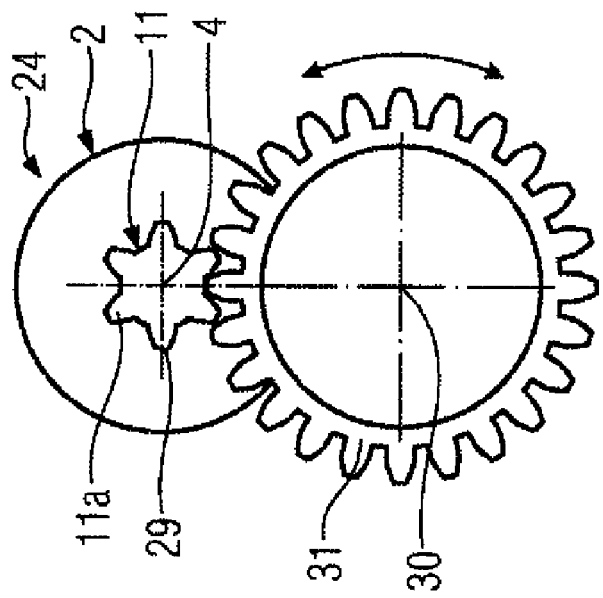
FIGS. 2 and 3 show further exemplary embodiments of drive devices with an alternative drive of the supporting shaft.
Figure 2:
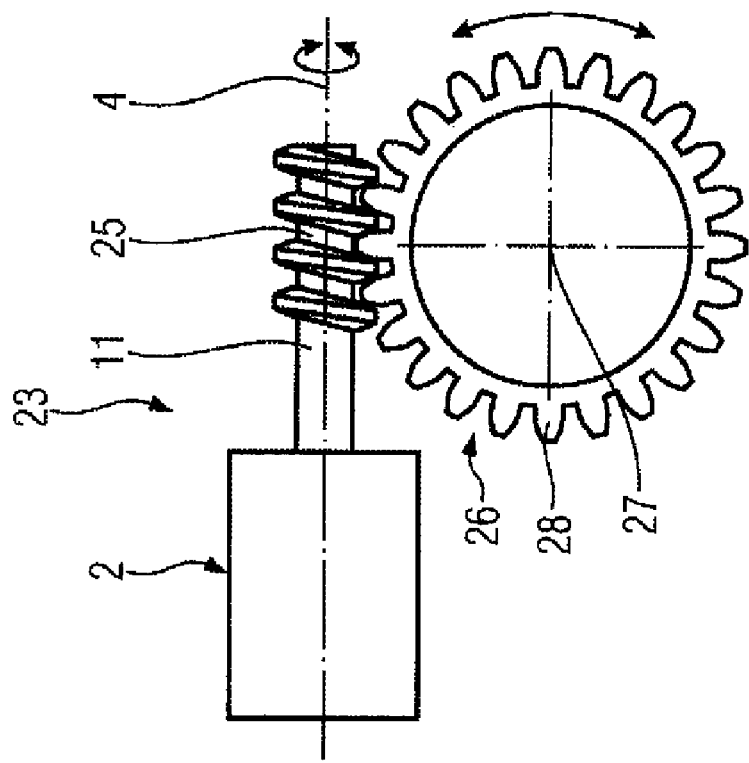

Parts corresponding to one another are given the same reference symbols in FIGS. 1 to 3.

FIG. 1 shows an exemplary embodiment of a drive device 1 of a synthetic material processing machine, not illustrated in any more detail, for the plasticization and injection of synthetic material. The drive device 1 has a main drive 2 which is designed as an electric motor and which comprises a stator 3 and a rotor 5 mounted drivably in rotation about an axis of rotation 4. The rotor 5 is arranged in a central bore of the stator 3. It is mounted fixedly on a hollow shaft 6 which is arranged coaxially to the axis of rotation 4 and the cylindrical cavity of which forms an inner reception region 7.

The reception region 7 is bipartitioned in the axial direction, that is to say in the direction of the axis of rotation. A first part region 8 faces the left end face of the hollow shaft 6 and a second part region 9 faces the right end face.

The hollow shaft 6 is designed as a sliding sleeve which on its inner wall, that is to say on the inner wall facing the reception region 7, has an inner longitudinal grooving, not shown in any more detail in FIG. 1, which runs in the axial direction.

In the part region 8, a freewheel 10 engages, with a complementary outer longitudinal grooving being provided on its outer circumference, into the inner longitudinal grooving of the hollow shaft 6, such that the hollow shaft 6 and the freewheel 10 are displaceable axially with respect to one another. Similarly, in the part region 9, a supporting shaft 11 rotatable about axis of rotation 4 engages, with a complementary external longitudinal grooving provided on its outer circumference, into the inner longitudinal grooving of the hollow shaft 6, such that the hollow shaft 6 and the supporting shaft 11 are displaceable axially with respect to one another. The outer longitudinal grooving of the supporting shaft 11 may be formed on the supporting shaft 11 either directly or, are shown in the exemplary embodiment according to FIG. 1, by means of a further sliding sleeve 12.

The freewheel 10 is fixedly connected, by means of a first braking element 13 of an axially displaceable rotary brake 14, to a connecting extension 15 of an axially displaceable extruder worm 16 rotatable about the axis of rotation 4. The braking element 13 extends with a flange-like part region into the outer space of the main drive 2 and there engages with an adjustable depth of engagement into a second braking element 17 of the rotary brake 14. The braking element 17 is axially displaceable synchronously with the extruder worm 16, but is mounted radially and tangentially, in a way not shown in any more detail, in the outer space of the main drive 2, for example on a housing of the main drive 2 or of the synthetic material processing machine.

In an alternative exemplary embodiment not shown, instead of the rotary brake 14, a further freewheel is provided, which is likewise mounted axially displaceably outside the main drive 2 and the freewheel direction of which is opposite to that of the freewheel 10.

The extruder worm 16 and the supporting shaft 11 are coupled to one another by means of an axial bearing 18 arranged within the reception region 7, such that the extruder worm 16 and the supporting shaft 11 can execute different rotational movements about the axis of rotation 4.

The supporting shaft 11 projects with one end 11a out of the part region 9 of the reception region 7. At this end 11a, the supporting shaft 11 is provided on the circumference with an external thread 19 which is guided within an internal thread of a threaded nut 20 rotatable about the axis of rotation 4. The threaded nut 20 is connected mechanically to an auxiliary drive 21 designed as a rotary device. Basically, in an alternative exemplary embodiment, not shown, the threaded nut 20 may also be designed not to be rotatable, but so as to be fastened rigidly.

Provided for also rotatably mounting the threaded nut 20 in the axial direction is a further axial bearing 22 to which the threaded nut 20 is connected by means of a shim 22a. The axial bearing 22 is mounted, in a similar way to the braking element 17, in the outer space of the main drive 2, the mounting of the axial bearing 22 being at a fixed location, in contrast to the braking element 17. The two axial bearings 18 and 22 are designed either as rolling bearings or as plain bearings. They can be maintained and exchanged in a simple way. This applies particularly to the axial bearing 22 which is mounted outside and is therefore accessible particularly easily.

The functioning and particular advantages of the drive device 1 are described in more detail below.

During the plasticizing operation, the rotor 5 rotates in a first direction of rotation. This rotational movement is transmitted to the extruder worm 16 by means of the hollow shaft 6, the longitudinal groove coupling to the freewheel 10, the freewheel 10 and the rotary brake 14. The extruder worm 16 rotates in its plasticizing direction. In this direction of rotation, oriented opposite to the freewheel direction of rotation of the freewheel 10, therefore, the freewheel 10 causes a take-up of the extruder worm 16. The rotary brake 14 is in the open, that is to say unbraked state, so that the rotational movement of the extruder worm 16 is not hindered.

The supporting shaft 11 is also driven by the rotor 5 and, because of the longitudinal groove coupling to the hollow shaft 6, in a rotational movement. In this operating state, the extruder worm 16 and the supporting shaft 11 rotate synchronously to one another. The external thread 19 and the threaded nut 20 cause a conversion of the rotational movement into an axial movement, directed along the axis of rotation 4, of the supporting shaft 11 and, because of the longitudinal coupling via the axial bearing 18, also of the extruder worm 16. The longitudinal groove couplings between the hollow shaft 6, on the one hand, and the freewheel 10 and supporting shaft 11, on the other hand, make an axial displacement of this type possible. Depending on the selected relative rotational speed between the rotor 5 and the threaded nut 20 driven by means of the auxiliary drive 21, a counter pressure and also a speed of rearward movement of the unit consisting of the extruder worm 16 and of the supporting shaft 11 can be set.

When the synthetic injection material introduced into the worm-shaped region of the extruder worm 16 is fully plasticized, the plasticizing operation ends and the injection operation begins. For this purpose, the direction of rotation of the main drive 2 is changed over. In this direction of rotation, the freewheel 10 does not transmit any torque to the extruder worm 16. By contrast, a transmission of rotational movement to the supporting shaft 11 takes place, even with the direction of rotation changed over. The axial bearing 18 allows this relative rotational movement between the extruder worm 16 and the supporting shaft 11. The threaded nut 20 is blocked by the auxiliary drive 21, that is to say its rotational movement is hindered. Consequently, during the injection operation, the rotational movement of the supporting shaft 11 causes a forwardly directed axial movement of the unit consisting of the extruder worm 16 and of the supporting shaft 11.

Moreover, at the start of the injection operation, the rotary brake 14 is also actuated. It is then in the blocked state and prevents a rotational movement of the extruder worm 16, possibly otherwise caused by the axial forward push, in the changed-over direction of rotation. Such a rotational movement could lead to an undesirable back flow of the plasticized injection material. Instead, the injection material is pressed as a result of the axial forward push into an injection mold via an injection nozzle, not shown in FIG. 1, at the front end of a housing surrounding the extruder worm 16. After the conclusion of the injection operation, a new cycle commences.

Together with the longitudinal groovings of the hollow shaft 6 and of the freewheel 10 which engage one in the other, the freewheel 10 and the rotary brake 14 form rotation transmission means for transmitting a rotational movement of the rotor 5 and consequently of the hollow shaft 6 to the extruder worm 16. On account of the freewheel 10, transmission takes place solely for rotational movements in one direction of rotation.

Similarly, the sliding sleeve 12, if present, the external thread 19 and the threaded nut 20, together with the longitudinal groovings of the hollow shaft 6 and of the supporting shaft 11 which engage one in the other, form conversion means for transmitting a rotational movement of the rotor 5 and consequently of the hollow shaft 6 to the supporting shaft 11 and for converting the transmitted rotational movement into an axial movement of the supporting shaft 11. Here, in contrast to the extruder worm 16, the transmission of the rotational movement takes place in both directions of rotation.

Thus, depending on the direction of rotation of the rotor 5, the main drive 2 drives either both the extruder worm 16 and the supporting shaft 11 or only the supporting shaft 11 in a rotational movement. With the drive device 1 being operated as intended, the extruder worm 16 rotates in only one direction of rotation.

The main drive 2 having heavy-duty dimensioning is used in all the torque-intensive work steps. Together with the converter, not shown in FIG. 1, which activates it, it performs the main work both during the plasticizing operation and during the injection operation. By contrast, the (optional) auxiliary drive 21 is intended only for less force-intensive holding operations and consequently also has a markedly lighter-duty design than the main drive 2.

Overall, as compared with known solutions, the drive device 1 makes it possible to save a second drive motor of heavy-duty dimensioning, including the associated converter. As a result, the overall installed electrical power for the synthetic material processing machine can also be lowered. This installed power constitutes a considerable cost factor.

Since the second heavy-duty drive motor, which is bulkier than the auxiliary drive 21, is saved, the drive device 1 is highly compact. As compared with known solutions, therefore, the synthetic material processing machine has a reduced overall construction length.

Moreover, as compared with known solutions, in the drive device 1 markedly lower forces act on the housing, not illustrated in any more detail in FIG. 1. The housing can thereby have lower dimensioning, at least in some part regions. This contributes to a cost reduction.

FIGS. 2 and 3 illustrate further exemplary embodiments of drive devices 23 and 24 with alternative guidances of the supporting shaft 11.

In the drive device 23 according to FIG. 2, the supporting shaft 11 again has, at its end projecting out of the reception region 7 of the main drive 2, an external thread 25 which is an integral part of a worm gear 26.

Moreover, the latter comprises a gearwheel 28 drivable in rotation about a gear axis of rotation 27 and engaging with its teeth into the thread flights of the external thread 25. The gear axis of rotation 27 is perpendicular to the axis of rotation 4. The gearwheel 28 can be driven in both directions of rotation. The worm gear 26 acts in a similar way to the combination of the external thread 19, threaded nut 20 and auxiliary drive 21 in the drive device 1 according to FIG. 1.

In the drive device 24 according to FIG. 3, the supporting shaft 11 has, at its end 11a projecting out of the reception region 7 of the main drive 2, a spur toothing 29, into which a gearwheel 31 drivable in rotation about a gear axis of rotation 30 engages. The gear axis of rotation 30 runs parallel to the axis of rotation 4. The gearwheel 31 can be driven in both directions of rotation. The mechanical coupling by means of the spur toothing 29 makes it possible to have a higher rotational speed than in the drive devices 1 and 23. In addition to the spur toothing 29 and the gearwheel 31, the drive device 24 has provided in it, in a similar way to the drive device 1, a combination of an external thread arranged on the supporting shaft 11 and of a guiding internal thread, in order to convert the rotational movement of the supporting shaft 11 into an axial movement.

What is claimed is:
1. A drive device for a machine for the plasticization and injection of synthetic material, said drive device comprising:

a main drive having a hollow shaft which is rotatable about an axis of rotation;

an axially bipartite inner reception region formed by the hollow shaft and having a first part region and a second part region;

rotation transmission means, arranged at least partially in the first part region, for transmitting a rotational movement of the hollow shaft solely in a first direction of rotation to an extruder worm which is rotatable about the axis of rotation; and conversion means, arranged at least partially in the second part region, for transmitting a rotational movement of the hollow shaft in the first and a second direction of rotation to a supporting shaft rotatable about the axis of rotation and displaceable axially in the first and second directions, and for converting the transmitted rotational movement into an axial movement of the supporting shaft.

2. The drive device of claim 1, further comprising an axial bearing, arranged within the reception region, for coupling the extruder worm and the supporting shaft.

3. The drive device of claim 1, wherein the rotation transmission means comprises a first freewheel in the second direction of rotation.

4. The drive device of claim 1, wherein the extruder worm includes a second freewheel in the first direction of rotation.

5. The drive device of claim 1, wherein the extruder worm includes an actuatable brake.

6. The drive device of claim 1, wherein the hollow shaft, on one hand, and the rotation transmission and conversion means on the other hand, have longitudinal groovings engaging one in the other.

7. The drive device of claim 1, wherein the conversion means includes an external thread, which is provided on the supporting shaft, and a threaded nut with an internal thread.

8. The drive device of claim 7, further comprising an auxiliary drive for rotating the threaded nut about the axis of rotation.

9. The drive device of claim 8, wherein the auxiliary drive is designed as a direct drive of a size which is smaller than the main drive.

10. The drive device of claim 7, wherein the supporting shaft has a spur toothing for engagement of a gearwheel.

11. The drive device of claim 10, wherein the gearwheel is constructed for allowing a rotation thereof.

12. The drive device of claim 1, wherein the conversion means includes an external thread provided on the supporting shaft, and a worm gear for engagement into the external thread.

* * * * *